(12) United States Patent
Kolbitsch et al.

(10) Patent No.: US 9,361,459 B2
(45) Date of Patent: Jun. 7, 2016

(54) METHODS AND SYSTEMS FOR MALWARE DETECTION BASED ON ENVIRONMENT-DEPENDENT BEHAVIOR

(71) Applicant: Lastline, Inc., Santa Barbara, CA (US)

(72) Inventors: Clemens Kolbitsch, Goleta, CA (US); Paolo Milani Comparetti, Goleta, CA (US); Ludovico Cavedon, Santa Barbara, CA (US)

(73) Assignee: LASTLINE, INC., Santa Barbara, CA (US)

( * ) Notice: Subject to any disclaimer, the term of this patent is extended or adjusted under 35 U.S.C. 154(b) by 418 days.

(21) Appl. No.: 13/866,980

(22) Filed: Apr. 19, 2013

(65) Prior Publication Data
US 2014/0317745 A1    Oct. 23, 2014

(51) Int. Cl.
*G06F 21/56*    (2013.01)
*H04L 29/06*    (2006.01)
*G06F 21/53*    (2013.01)

(52) U.S. Cl.
CPC .......... *G06F 21/566* (2013.01); *H04L 63/1416* (2013.01); *G06F 21/53* (2013.01)

(58) Field of Classification Search
CPC ....... G06F 21/56; G06F 21/566; G06F 21/53; G06F 21/55; G06F 11/1435; G06F 11/008; H04L 63/1416; H04L 63/1408; H04L 63/145; H04L 63/1441; H04L 63/0227
See application file for complete search history.

(56) References Cited

U.S. PATENT DOCUMENTS

| | | | |
|---|---|---|---|
| 6,851,057 B1 * | 2/2005 | Nachenberg | G06F 21/563 703/23 |
| 7,739,740 B1 * | 6/2010 | Nachenberg | G06F 21/566 709/206 |
| 8,214,497 B2 | 7/2012 | Alperovitch et al. | |

(Continued)

FOREIGN PATENT DOCUMENTS

EP    1 459 171 A2    9/2004

OTHER PUBLICATIONS

International Search Report & Written Opinion on PCT/US2014/031443 dated Sep. 5, 2014.
(Continued)

*Primary Examiner* — Eleni Shiferaw
*Assistant Examiner* — Gregory M Elmore
(74) *Attorney, Agent, or Firm* — Foley & Lardner LLP; John D. Lanza

(57) ABSTRACT

The present disclosure is directed to methods and systems for malware detection based on environment-dependent behavior. Generally, an analysis environment is used to determine how input collected from an execution environment is used by suspicious software. The methods and systems described identify use of environmental information to decide between execution paths leading to malicious behavior or benign activity. In one aspect, one embodiment of the invention relates to a method comprising monitoring execution of suspect computer instructions; recognizing access by the instructions of an item of environmental information; identifying a plurality of execution paths in the instructions dependant on a branch in the instructions based on a value of the accessed item of environmental information; and determining that a first execution path results in benign behavior and that a second execution path results in malicious behavior. The method comprises classifying the computer instructions as evasive malware responsive to the determination.

20 Claims, 4 Drawing Sheets

(56) References Cited

U.S. PATENT DOCUMENTS

| | | | |
|---|---|---|---|
| 8,296,842 B2 | 10/2012 | Singh et al. | |
| 2010/0107252 A1* | 4/2010 | Mertoguno | G06F 21/55 726/23 |
| 2011/0016528 A1* | 1/2011 | Zhou | H04L 41/0677 726/23 |
| 2011/0145926 A1 | 6/2011 | Dalcher et al. | |
| 2011/0252472 A1 | 10/2011 | Ehrlich et al. | |
| 2011/0258164 A1* | 10/2011 | Mandagere | G06F 11/1435 707/685 |
| 2011/0302656 A1 | 12/2011 | El-Moussa | |
| 2011/0307954 A1* | 12/2011 | Melnik | H04L 63/0227 726/22 |
| 2012/0304130 A1 | 11/2012 | Rueff et al. | |
| 2012/0317306 A1 | 12/2012 | Radinsky et al. | |
| 2013/0097706 A1* | 4/2013 | Titonis | G06F 21/56 726/24 |
| 2013/0124921 A1* | 5/2013 | Canini | G06F 11/008 714/33 |

OTHER PUBLICATIONS

Brustolini, et al. "Efficient Detection of Bots in Subscribers' Computers" IEEE ICC 2009, (2009).

Comparetti, et al. "Identifying Dormant Functionality in Malware Programs," IEEE Symposium on Security and Privacy (May 2010).

Ho, et al. "Practical Taint-Based Protection using Demand Emulation" EuroSys01906, (Apr. 2006).

Jacob, et al. "Jackstraws: Picking Command and Control Connections from Bot Traffic," 20th Usenix Security Symposium (Aug. 2011).

Kolbitsch, et al. Rozzle: De-Cloaking Internet Malware, Microsoft Research Technical Report, Aug. 5, 2011 (20 pages).

Lindorfer, et al. Detecting Environment-Senstive Malware, Recent Advances in Intrusion Detection, Springer Berlin Heidelberg, Jan. 2011.

Moser, et al. "Exploring Multiple Execution Paths for Malware Analysis," IEEE Symposium on Security and Privacy (May 2007).

Srinivasan, et al. Process Out-Grafting: An Efficient "Out-of-VM" Approach for Fine-Grained Process Execution Monitoring, 18th ACM Conference on Computer and Communications Security (Oct. 2011).

Stone-Gross, et al. "The Underground Economy of Spam: A Botmaster's Perspective of Coordinating Large-Scale Spam Campaigns," 4th Usenix Workshop on Large-Scale Exploits and Emergent Threats, Boston, Mar. 2011.

* cited by examiner

METHODS AND SYSTEMS FOR MALWARE DETECTION BASED ON ENVIRONMENT-DEPENDENT BEHAVIOR

BACKGROUND OF THE INVENTION

The present invention relates generally to the field of computer security. In general, a computing device may have one or more vulnerabilities that can be leveraged by malicious code to compromise the computing device. In addition, malicious code might be introduced onto a computing device by deceiving the user. Computer security is improved through the detection of malicious software ("malware") that uses malicious code to exploit vulnerabilities or deceives the user in order to repurpose infected computers. Once malware is detected, the deceptive behavior is identified, and/or the exploits are understood, security systems may be designed to recognize and block the malware and the vulnerabilities may be patched.

SUMMARY OF THE INVENTION

The present disclosure is directed to methods and systems for malware detection based on environment-dependent behavior. Generally, an analysis environment is used to determine how input collected from an execution environment is used by suspicious software. The methods and systems described identify where an execution path alternatively leads to benign or malicious behavior.

In one aspect, one embodiment of the invention relates to a method for classifying malicious computer code. The method comprises monitoring the execution of a computer program comprising suspicious computer code and recognizing access by the computer program of an item of environmental information. The method comprises identifying a plurality of execution paths in the computer program dependant on a branch in the computer program based on a value of the accessed item of environmental information. The method comprises determining that a first execution path in the plurality of execution paths results in benign behavior and that a second execution path in the plurality of execution paths results in malicious behavior. The method comprises classifying the computer program as evasive malware responsive to the determining.

In some embodiments, the method further comprises executing the computer program in a controlled computing environment. In some embodiments, the controlled computing environment is a virtual machine. In some embodiments, the controlled computing environment is based on hardware-supported virtualization. In some embodiments, monitoring execution of the computer program comprises monitoring the controlled computing environment. In some embodiments, monitoring execution of the computer program comprises monitoring one or more computer memory elements. In some embodiments, the method further comprises altering the accessed item of environmental information to cause execution of the second path in the plurality of execution paths in the computer program.

In one aspect, one embodiment of the invention relates to a system for classifying malicious computer code, the system comprising one or more computing processors configured to: monitor execution of a computer program comprising suspicious computer code; recognize access by the computer program of an item of environmental information; identify a plurality of execution paths in the computer program dependant on a branch in the computer program based on a value of the accessed item of environmental information; determine that a first execution path in the plurality of execution paths results in benign behavior and that a second execution path in the plurality of execution paths results in malicious behavior; and classify the computer program as evasive malware responsive to the determining.

In some embodiments, the system comprises one or more computing processors configured to provide a controlled computing environment and the monitored computer program executes in the controlled computing environment. In some embodiments, the controlled computing environment is a virtual machine. In some embodiments, the controlled computing environment is based on hardware-supported virtualization. In some embodiments, the processors are configured to monitor execution of the computer program by monitoring the controlled computing environment. In some embodiments, the processors are configured to monitor execution of the computer program by monitoring one or more computer memory elements. In some embodiments, the processors are further configured to alter the accessed item of environmental information to cause execution of the second path in the plurality of execution paths in the computer program.

In general, in some embodiments, access by the computer program of an item of environmental information may include when the computer program reads one or more files; the computer program reads one or more registry keys; the computer program reads a variable maintained by the operating system; the computer program queries an event handler; the computer program queries an event queue; the computer program interacts directly with hardware; the computer program interacts with a network; the computer program interacts with a device driver; and/or when the computer program interacts with the BIOS or firmware. A branch in the computer program may be based on a value of the accessed item of environmental information when the computer program compares the value of the accessed item with a second information item. The second information item may be a second item of environmental information. The second information item may be internal to the monitored computer program.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION OF THE PREFERRED EMBODIMENTS

Figure 1:
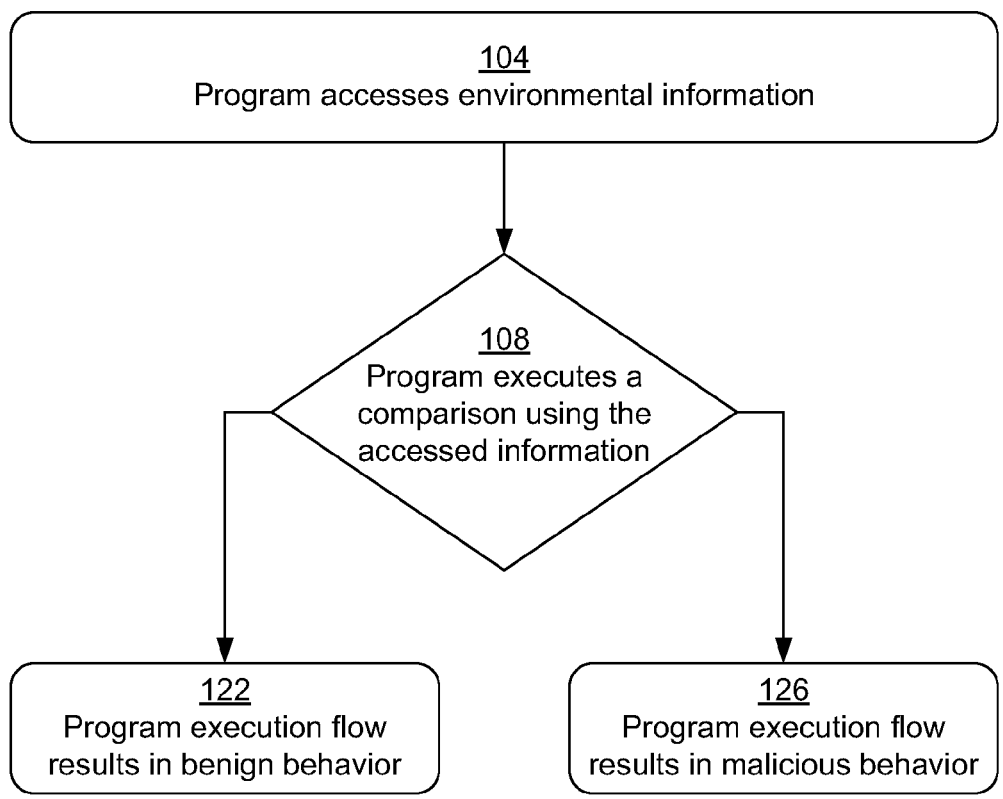
FIG. 1 is a flowchart depicting the steps taken during evasive program execution.

Following below are more detailed descriptions of various concepts related to, and embodiments of, methods, apparatuses, and systems introduced above. The various concepts introduced above and discussed in greater detail below may be implemented in any of numerous ways, as the concepts described are not limited to any particular manner of embodiment. Examples of specific embodiments and applications are provided primarily for illustrative purposes.

In general, a computing device connected to a data network may have one or more vulnerabilities that can be leveraged to compromise the computing device. Vulnerabilities include unintentional program flaws such as a buffer with inadequate overrun prevention and intentional holes such as an undisclosed programmatic backdoor. Malicious code can, and has been, developed to exercise these various vulnerabilities to yield the execution of code under the control of an attacker. Malicious code implemented to target a particular vulnerability is sometimes referred to as an exploit. For example, malicious code may access an apparently benign interface and cause a buffer overflow resulting in the placement of unauthorized code in the execution stack where it may be run with elevated privileges. Such an attack could execute an exploit causing the buffer overflow and enabling an unauthorized party to obtain administrative control over the computing device. Commonly, the exploit code downloads additional components of the malware and modifies the operating system to become persistent. The computing device, now compromised, may be used for further attacks on other computing devices in the network or put to other malicious purposes.

Computing devices may also be compromised by deceiving a user into installing malicious software. For example, the malicious software may be packaged in a way that is appealing to the user or in a way that makes it similar to another known benign program (e.g., a program to display a video). A user may be deceived into installing malicious software without the user understanding what he or she has done.

Some compromised machines are configured to communicate with a remote endpoint, e.g., a command and control ("C&C") system. For example, a compromised machine may check in with a C&C to receive instructions for how the compromised machine should be used (e.g., to send unsolicited e-mails, i.e., "spam," or to participate in a distributed denial-of-service attack, "D-DOS"). Some malicious attackers use generic domain names for the C&C in an effort to go unnoticed. A compromised machine is sometimes referred to as a "Bot" or a "Zombie" machine. A network of these machines is often referred to as a "botnet."

Malicious code may be embodied in malicious software ("malware"). As used herein, malware includes, but is not limited to, computer viruses, worms, Trojans, rootkits, adware, and spyware. Malware may generally include any software that circumvents user or administrative controls. Malicious code may be created by an individual for a particular use. Generally, because malicious activity can happen in many forms, it is desirable to recognize previously unknown malicious code.

In some instances, malware may be designed to avoid detection. For example, malware may be designed to load into memory before malware detection software starts during a boot-up phase. Malware may be designed to integrate into an operating system present on an infected machine. Malware may bury network communication in apparently benign network communication. Malware may connect to legitimate network endpoints to obscure connections to control servers or other targets. In some instances, malware behaves in an apparently benign manner until a trigger event, e.g., a set day arrives. In some instances, malware is reactive to environmental conditions. For example, malware may be designed to behave in an apparently benign manner in the presence of malware detection software.

FIG. 1 is a flowchart depicting one embodiment of steps taken during evasive program execution. At step 104, a program accesses environmental information. At step 108, the program executes a comparison using the accessed environmental information. The comparison results in a branch and the program execution flow proceeds either to step 122, where the execution flow results in benign behavior, or to step 126, where the execution flow results in malicious behavior.

At step 104, the program accesses environmental information. The computer program might read one or more computer files. The computer program might read a variable maintained by the operating system. The computer program might read one or more registry keys. The computer program might query an event handler. The computer program might query an event queue, e.g., a kQueue. The computer program might interact with a device driver. The computer program might interact directly with hardware. For example, the computer program may directly read from a memory register. The computer program might interact with the computer's BIOS or firmware. The accessed item of environmental information may provide the program with control information or context that impacts the behavior of the program.

At step 108, the program executes a comparison using the item of environmental information accessed at step 104. Generally, the comparison results in a branch. That is, if a value of the item of accessed environmental information satisfies a condition (e.g., greater than a threshold, equal to a value, not equal to zero, etc.) then execution will jump to a specific instruction and otherwise execution will proceed with a different instruction (typically the next instruction in the sequence of instructions being executed). The program may utilize a case statement based on the environmental information accessed at step 104. The program may alter the item of environmental information prior to a branch instruction; for example, the program may add or subtract another value to the accessed item. At step 108, the execution flow is impacted by the accessed item of environmental information, either altered or unaltered.

The program execution flow proceeds either to step 122, where the execution flow results in benign behavior, or to step 126, where the execution flow results in malicious behavior. At step 122, the execution flow results in benign behavior. That is, the computer program does not exhibit malicious characteristics. Generally, if the computer program is suspected of comprising malicious code, it is possible that the computer program is attempting to evade detection by concealing the malicious code in the presence of the accessed item of environmental information. In some embodiments, the computer program memory may be altered to change the value accessed and the program caused to re-execute from the branch. In some embodiments, the execution environment may be altered to change the value accessed and the program caused to re-execute from the branch. In some embodiments, additional events are triggered. In some embodiments, the branch instruction is reversed so that the same input causes the opposite result. The suspect code is then analyzed to identify how it reacts to the change.

At step 126, the execution flow results in malicious behavior. That is, the computer program exhibits malicious characteristics. For example, the computer program may attempt to install a rootkit or try to terminate a process (e.g., a process associated with virus protection software). Generally, if the computer program execution results in an undesirable computer state, the program may comprise malicious code. It is possible that the computer program is designed to attempt to evade detection by concealing the malicious code in the presence of the accessed item of environmental information. In some embodiments, the computer program memory may be altered to change the value accessed and the program caused to re-execute from the branch. In some embodiments, the execution environment may be altered to change the value accessed and the program caused to re-execute from the branch. In some embodiments, additional events are triggered. In some embodiments, the branch instruction is reversed so that the same input causes the opposite result. The suspect code is then analyzed to identify how it reacts to the change.

Generally, a computer program may be considered evasive malware if the computer program exhibits, or results in, malicious behavior under specific conditions. An evasive malicious program may attempt to conceal malicious behavior based on environmental information. An evasive malicious program may access environmental information (as in step 104), execute a comparison using the accessed information (as in step 108), and depending on the comparison the resulting execution flow may result in benign behavior (as in step 122) or result in malicious behavior (as in step 126). A classification system may execute a program in a controlled environment and manipulate the flow of execution by altering the program memory and/or accessed environmental information.

Figure 2:
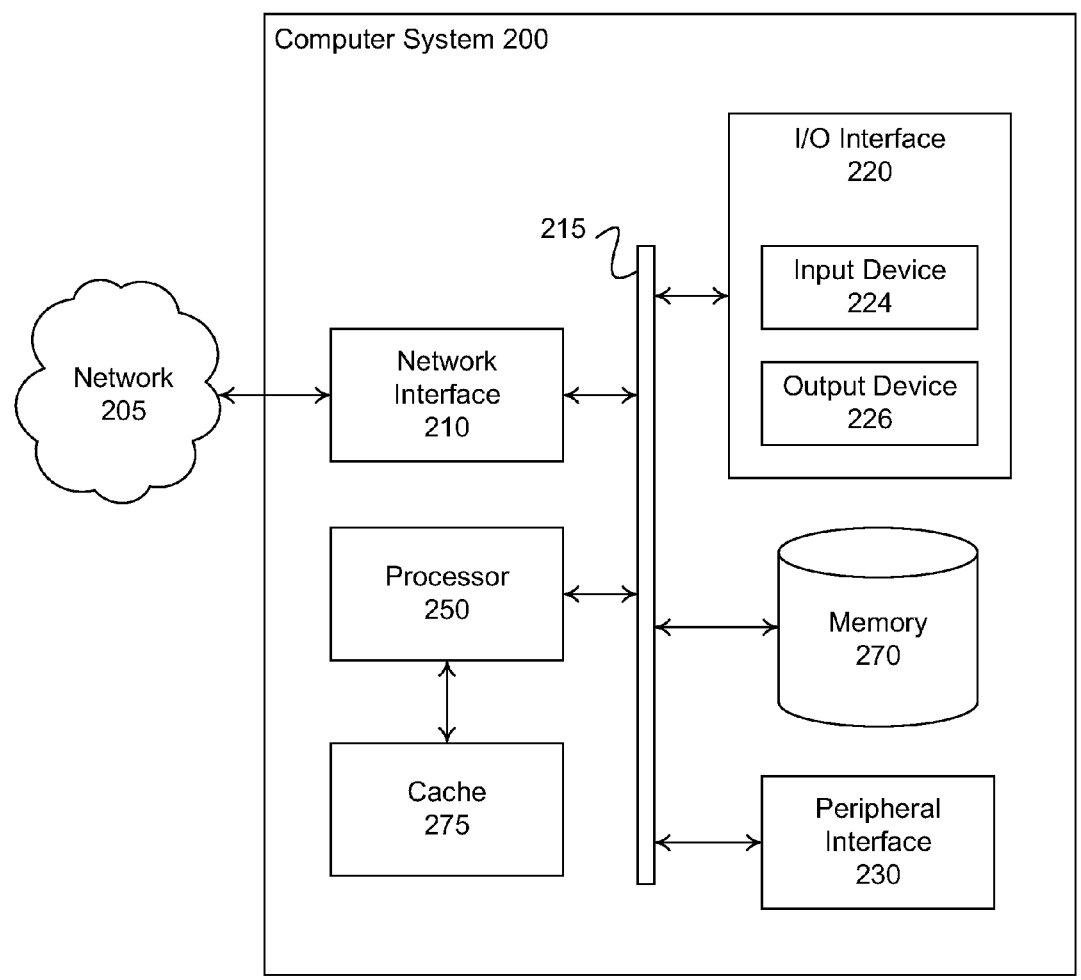
FIG. 2 is a block diagram depicting one embodiment of a general architecture of a computing device useful in connection with the methods and systems described herein.

FIG. 2 is a block diagram illustrating a general architecture of a computing system 200 useful in connection with the methods and systems described herein. The example computing system 200 includes one or more processors 250 in communication, via a bus 215, with one or more network interfaces 210 (in communication with a network 205), I/O interfaces 220 (for interacting with a user or administrator), and memory 270. The processor 250 incorporates, or is directly connected to, additional cache memory 275. In some uses, additional components are in communication with the computing system 200 via a peripheral interface 230. In some uses, such as in a server context, there is no I/O interface 220 or the I/O interface 220 is not used. In some uses, the I/O interface 220 supports an input device 224 and/or an output device 226. In some uses, the input device 224 and the output device 226 use the same hardware, for example, as in a touch screen. In some uses, the computing device 200 is stand-alone and does not interact with a network 205 and might not have a network interface 210.

In some embodiments, one or more computing systems described herein are constructed to be similar to the computing system 200 of FIG. 2. For example, a user may interact with an input device 224, e.g., a keyboard, mouse, or touch screen, to access an interface, e.g., a web page, over the network 205. The interaction is received at the user's device's interface 210, and responses are output via output device 226, e.g., a display, screen, touch screen, or speakers.

The computing device 200 may communicate with one or more remote computing devices via a data network 205. The network 205 can be a local-area network (LAN), such as a company intranet, a metropolitan area network (MAN), or a wide area network (WAN), such as the Internet and the World Wide Web. The network 205 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some embodiments, there are multiple networks 205 between participants, for example a smart phone typically communicates with Internet servers via a wireless network connected to a private corporate network connected to the Internet. The network 205 may be public, private, or a combination of public and private networks. The topology of the network 205 may be a bus, star, ring, or any other network topology capable of the operations described herein.

In some embodiments, one or more devices are constructed to be similar to the computing system 200 of FIG. 2. In some embodiments, a server may be made up of multiple computer systems 200. In some embodiments, a server may be a virtual server, for example, a cloud-based server accessible via the network 205. A cloud-based server may be hosted by a third-party cloud service host. A server may be made up of multiple computer systems 200 sharing a location or distributed across multiple locations. The multiple computer systems 200 forming a server may communicate using the user-accessible network 205. The multiple computer systems 200 forming a server may communicate using a private network, e.g., a network distinct from a publicly-accessible network or a virtual private network within a publicly-accessible network.

The processor 250 may be any logic circuitry that processes instructions, e.g., instructions fetched from the memory 270 or cache 275. In many embodiments, the processor 250 is a microprocessor unit, such as: those manufactured by Intel Corporation of Mountain View, Calif.; those manufactured by Motorola Corporation of Schaumburg, Illinois; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif.. The computing device 200 may be based on any of these processors, or any other processor capable of operating as described herein. The processor 250 may be a single core or multi-core processor. The processor 250 may be multiple processors.

The I/O interface 220 may support a wide variety of devices. Examples of an input device 224 include a keyboard, mouse, touch or track pad, trackball, microphone, touch screen, or drawing tablet. Example of an output device 226 include a video display, touch screen, speaker, inkjet printer, laser printer, dye-sublimation printer, or 3D printer. In some embodiments, an input device 224 and/or output device 226 may function as a peripheral device connected via a peripheral interface 230.

A peripheral interface 230 supports connection of additional peripheral devices to the computing system 200. The peripheral devices may be connected physically, as in a FireWire or universal serial bus (USB) device, or wirelessly, as in a Bluetooth device. Examples of peripherals include keyboards, pointing devices, display devices, audio devices, hubs, printers, media reading devices, storage devices, hardware accelerators, sound processors, graphics processors, antennas, signal receivers, measurement devices, and data conversion devices. In some uses, peripherals include a network interface and connect with the computing system 200 via the network 205 and the network interface 210. For example, a printing device may be a network accessible printer.

The computing system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing system 200 may comprise a gaming device such as a PLAYSTATION (PS 1/2/3/4/x) or PERSONAL PLAYSTATION PORTABLE (PSP) device manufactured by the Sony Corporation of Tokyo, Japan, a NINTENDO, GAME BOY, or WII device manufactured by Nintendo Co., Ltd., of Kyoto, Japan, or an XBOX or XBOX 360 device manufactured by the Microsoft Corporation of Redmond, Wash. For example, the computing system 200 may comprise a tablet device such as one of the IPAD family of devices manufactured by Apple Computer of Cupertino, Calif.

Figure 3:
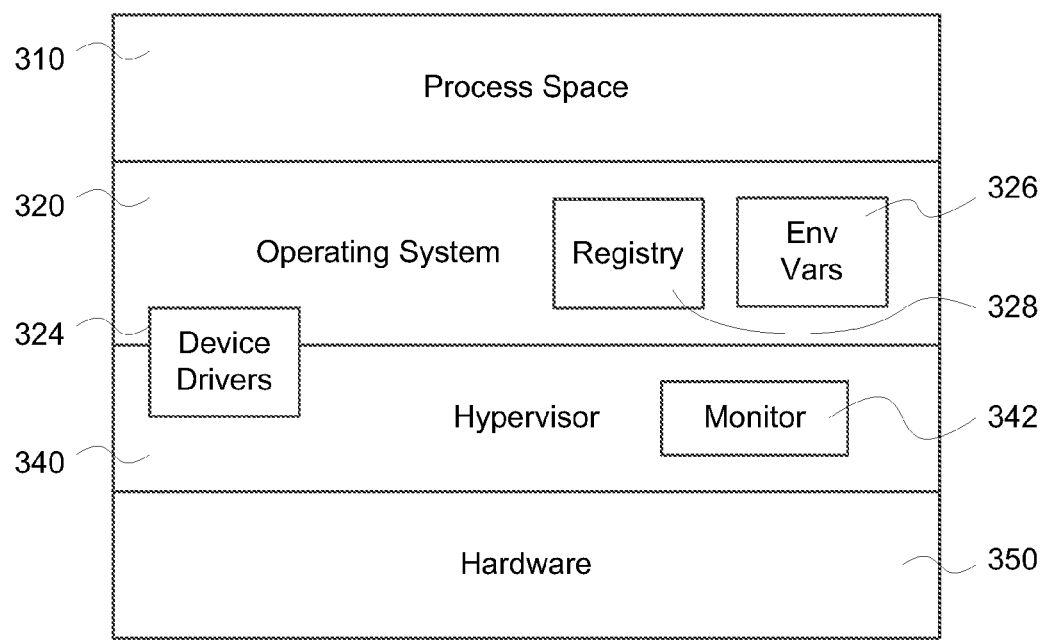
FIG. 3 is a block diagram depicting an embodiment of an execution space for monitoring a computer program.

FIG. 3 is a block diagram depicting one embodiment of an execution space for monitoring a computer program. In general, a computing environment comprises hardware 350 and software executing on the hardware. A computer program is a set of instructions executed by one or more processors (e.g., processor 250). In a simplified view, the program instructions manipulate data in a process space 310 within the confines of an operating system 320. The operating system 320 generally controls the process space 310 and provides access to hardware 350, e.g., via device drivers 324. Generally, an operating system 320 may provide the process space 310 with various native resources, e.g., environmental variables 326 and/or a registry 328. In some embodiments, the operating system 320 runs on a hypervisor 340, which provides a virtualized computing environment. The hypervisor 340 may run in the context of a second operating system or may run directly on the hardware 350. Generally, software executing in the process space 310 is unaware of the hypervisor 340. The hypervisor 340 may host a monitor 342 for monitoring the operating system 320 and process space 310.

The process space 310 is an abstraction for the processing space managed by the operating system 320. Generally, program code is loaded by the operating system into memory allocated for respective programs and the processing space 310 represents the aggregate allocated memory. Software typically executes in the process space 310. Malware detection software running in the process space 310 may have a limited view of the overall system, as the software is generally constrained by the operating system 320.

The operating system 320 generally controls the process space 310 and provides access to hardware 350, e.g., via device drivers 324. An operating system typically includes a kernel and additional tools facilitating operating of the computing platform. Generally, an operating system 320 may provide the process space 310 with various native resources, e.g., environmental variables 326 and/or a registry 328. Examples of operating systems include any of the operating systems from Apple, Inc. (e.g., OS X or iOS), from Microsoft, Inc. (e.g., Windows NT, Windows XP, Windows Server 2008, Windows 7, or Windows 8), from Google Inc. (e.g., Chrome or Android), or Bell Lab's UNIX and its derivatives (e.g., BSD, FreeBSD, NetBSD, Linux, Solaris, AIX, or HP/UX). Some malware may attempt to modify the operating system 320. For example, a rootkit may install a security backdoor into the operating system.

Environmental variables 326 may include, but are not limited to: a clock reporting a time and date; file system roots and paths; version information; user identification information; device status information (e.g., display active or inactive or mouse active or inactive); an event queue (e.g., graphic user interface events); and uptime. In some embodiments, an operating system 320 may provide context information to a process executing in process space 310. For example, a process may be able to determine if it is running within a debugging tool.

An operating system 320 may provide a registry 328, e.g., Windows Registry. The registry may store one or more environmental variables 326. The registry may store file type association, permissions, access control information, path information, and application settings. The registry may comprise entries of key/value pairs.

In some embodiments, the operating system 320 runs on a hypervisor 340, which provides a virtualized computing environment. The hypervisor 340, also referred to as a virtual machine monitor ("VMM"), creates one or more virtual environments by allocating access by each virtual environment to underlying resources, e.g., the underlying devices and hardware 350. Examples of a hypervisor 320 include the VMM provided by VMware, Inc., the XEN hypervisor from Xen.org, or the virtual PC hypervisor provided by Microsoft. The hypervisor 340 may run in the context of a second operating system or may run directly on the hardware 350. The hypervisor 340 may virtualize one or more hardware devices, including, but not limited to, the computing processors, available memory, and data storage space. The hypervisor can create a controlled computing environment for use as a testbed or sandbox. Generally, software executing in the process space 310 is unaware of the hypervisor 340.

The hypervisor 340 may host a monitor 342 for monitoring the operating system 320 and process space 310. The monitor 342 can detect changes to the operating system 320. The monitor 342 can modify memory virtualized by the hypervisor 340. The monitor 342 can be used to detect malicious behavior in the process space 310.

Device drivers 324 generally provide an application programming interface ("API") for hardware devices. For example, a printer driver may provide a software interface to a physical printer. Device drivers 324 are typically installed within an operating system 320. Device drivers 324 may be modified by the presence of a hypervisor 340, e.g., where a device is virtualized by the hypervisor 340.

The hardware layer 350 may be implemented using the computing device 200 described above. The hardware layer 350 represents the physical computer resources virtualized by the hypervisor 340.

Environmental information may include files, registry keys for the registry 328, environmental variables 326, or any other variable maintained by the operating system. Environmental information may include an event handler or an event queue. For example, a Unix kQueue. Environmental information may include presence or activity of other programs installed or running on the computing machine. Environmental information may include responses from a device driver 324 or from the hardware 350 (e.g., register reads, or responses from the BIOS or other firmware).

Figure 4:
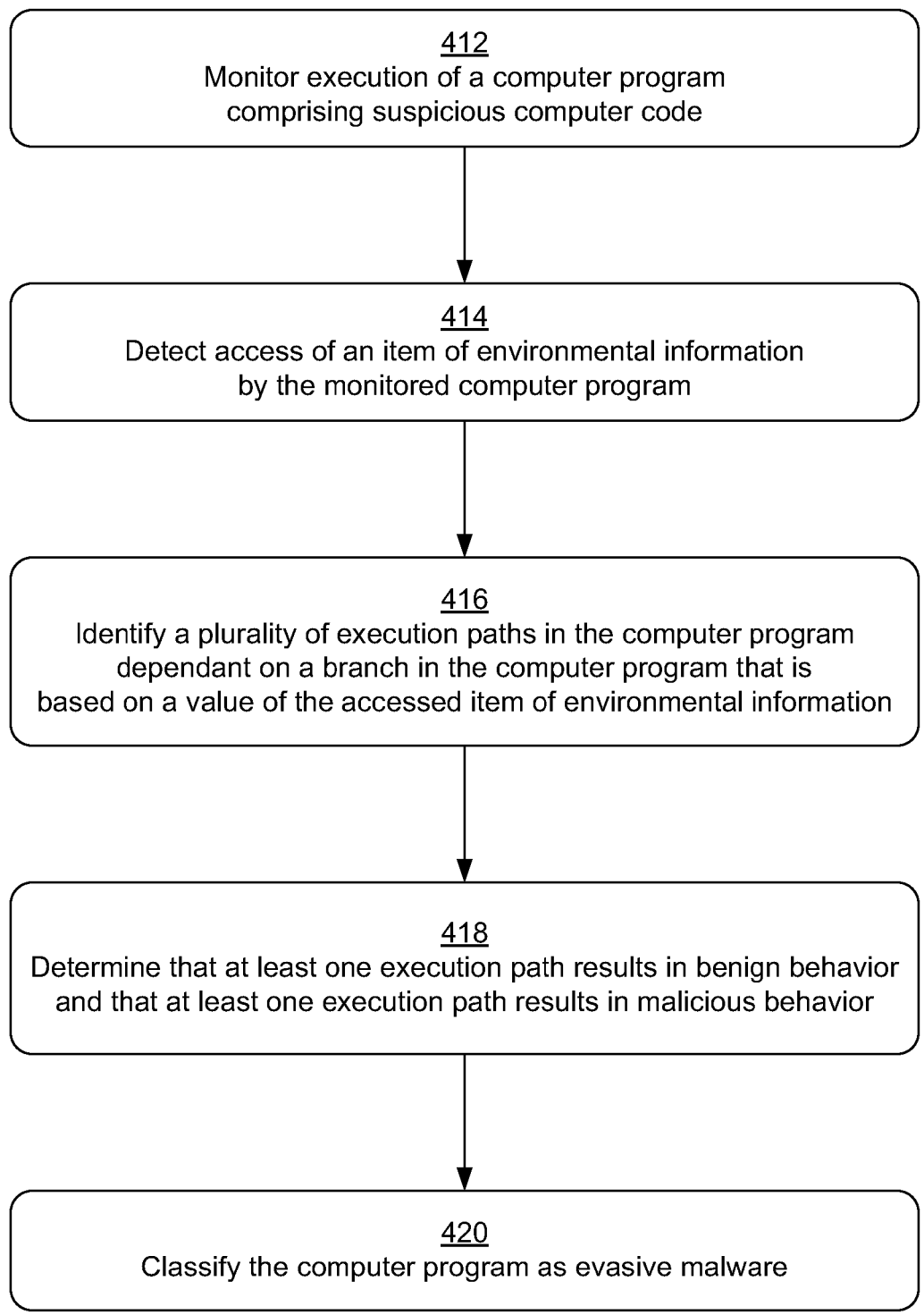
FIG. 4 is a flowchart depicting the steps taken in one embodiment of a method for classifying a computer program as evasive malware.

FIG. 4 is a flowchart depicting the steps taken in one method for classifying a computer program as evasive malware. At step 412, a monitor, e.g., the monitor 342 illustrated in FIG. 3, monitors execution of a computer program comprising suspicious computer code. At step 414, the monitor 342 detects access of an item of environmental information by the monitored computer program. At step 416, the monitor 342 identifies a plurality of execution paths in the computer program dependant on a branch in the computer program that is based on a value of the accessed item of environmental information. At step 418, the monitor 342 determines that at least one execution path results in benign behavior and that at least one execution path results in malicious behavior. At step 420, the monitor classifies the computer program as evasive malware.

At step 412, the monitor 342 monitors execution of a computer program comprising suspicious computer code. The computer program executes in process space 310 within the context of an operating system 320. In some embodiments, the operating system 320 is running on a virtual machine. The virtual machine may be software based, may be hardware-supported, and/or may be running "on bare metal". In some embodiments, the monitor 342 controls execution of the suspect computer program.

At step 414, the monitor 342 detects access of an item of environmental information by the monitored computer program. The monitored program may read one or more computer files. The monitored program might read a variable maintained by the operating system. The monitored program might read one or more registry keys. The monitored program might query an event handler. The monitored program might query an event queue, e.g., a kQueue. The monitored program might interact with a network. The monitored program might interact with a device driver. The monitored program might interact with the computer's BIOS or firmware. The accessed item of environmental information may provide the monitored program with control information or context that impacts the behavior of the program.

The monitored computer program may access the environmental information without user interaction. For example, a computer program may periodically check a computer's clock for the current computer date and branch to malicious code only when the computer date satisfies a condition. A computer user may be completely unaware that the monitored computer program has accessed the environmental information.

In some embodiments, the monitor 342 detects access of environmental information by using a hooking mechanism. In some embodiments, the monitor 342 detects access of environmental information by using a modified device driver and/or a modified operating system. In some embodiments, the monitor 342 detects access of environmental information by monitoring a virtualized environment. In some embodiments, the monitor 342 detects access of environmental information by using other user-mode or kernel mode techniques to intercept environment access calls. In some embodiments, the monitor 342 uses a static program analysis technique to identify instructions that access environmental information.

At step 416, the monitor 342 identifies a plurality of execution paths in the computer program dependant on a branch in the computer program that is based on a value of the accessed item of environmental information. For example, the monitor 342 may identify a branch instruction in the monitored program that is dependent, either directly or indirectly, on a value of the accessed item of environmental information. The branch instruction may compare the value to another value internal to the program, read from the environment, or generated by the program.

At step 418, the monitor 342 determines that at least one execution path results in benign behavior and that at least one execution path results in malicious behavior. Generally, the monitor 342 causes the program to execute each of the plurality of execution paths identified in step 416. The monitor 342 may create a snapshot of the computing environment at the time of the branch instruction, allow execution of the program, determine if execution results in benign or malicious behavior, restore the computing environment to the snapshot, cause execution of the program to follow the alternative branch, and determine if the alternate execution results in benign or malicious behavior. The monitor 342 can cause execution of the program to change by altering the memory space of the program itself, by altering the environmental information accessed by the program, or by moving the execution stack to the branched instruction address. In some embodiments, the monitor 342 can determine that the paths lead to benign or malicious behavior without the need to execute the code, e.g., by using static analysis techniques.

At step 420, the monitor classifies the computer program as evasive malware if the plurality of execution paths include both a path resulting in benign behavior and a path resulting in malicious behavior.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, C, C++, C#, PROLOG, or in any byte code language such as JAVA. The software programs may be stored on or in one or more articles of manufacture as object code.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method of classifying malicious computer code, the method comprising:
    monitoring, by one or more computing processors, execution in a computing environment of a computer program comprising suspicious computer code;
    detecting, by at least one of the one or more computing processors, access by the computer program of an item of environmental information for the computing environment;
    identifying a branch in the computer program where the branch is based on a value of the accessed item of environmental information;
    identifying a plurality of execution paths in the computer program stemming from the identified branch in the computer program;
    causing execution of the plurality of execution paths by:
        creating a snapshot of the computing environment;
        monitoring execution of the computer program in the computing environment consistent with the snapshot;
        restoring the computing environment to the snapshot;
        altering the accessed item of environmental information in the restored computing environment; and
        monitoring execution of the computer program in the restored computing environment consistent with the altered item of environmental information;
    determining, based on the execution of the plurality of execution paths, that a first execution path in the plurality of execution paths results in benign behavior and that a second execution path in the plurality of execution paths results in malicious behavior; and
    classifying the computer program as evasive malware responsive to the determining.

2. The method of claim 1, further comprising executing the computer program in a controlled computing environment.

3. The method of claim 2, wherein the controlled computing environment is a virtual machine.

4. The method of claim 2, wherein the controlled computing environment is based on hardware-supported virtualization.

5. The method of claim 2, wherein monitoring execution of the computer program comprises monitoring the controlled computing environment.

6. The method of claim 5, wherein monitoring the controlled computing environment comprises monitoring one or more computer memory elements.

7. The method of claim 1, wherein access by the computer program of an item of environmental information comprises at least one of:
    a) the computer program reads one or more files;
    b) the computer program reads one or more registry keys;
    c) the computer program reads a variable maintained by the operating system;
    d) the computer program queries an event handler;
    e) the computer program queries an event queue;
    f) the computer program interacts with a device driver;
    g) the computer program interacts directly with hardware;
    h) the computer program interacts with a network; and
    i) the computer program interacts with the BIOS or firmware.

8. The method of claim 1, wherein a branch in the computer program is based on a value of the accessed item of environmental information when the computer program compares the value of the accessed item with a second information item.

9. The method of claim 8, wherein the second information item is a second item of environmental information.

10. The method of claim 8, wherein the second information item is internal to the computer program.

11. The method of claim 1, further comprising altering the accessed item of environmental information to cause execution of the second path in the plurality of execution paths in the computer program.

12. A system for classifying malicious computer code, the system comprising one or more computing processors configured to:
    monitor execution in a computing environment of a computer program comprising suspicious computer code;
    detect access by the computer program of an item of environmental information for the computing environment;
    identify a branch in the computer program where the branch is based on a value of the accessed item of environmental information;
    identify a plurality of execution paths in the computer program stemming from the identified branch in the computer program;
    cause execution of the plurality of execution paths by:
        creating a snapshot of the computing environment;
        monitoring execution of the computer program in the computing environment consistent with the snapshot;
        restoring the computing environment to the snapshot;
        altering the accessed item of environmental information in the restored computing environment; and
        monitoring execution of the computer program in the restored computing environment consistent with the altered item of environmental information;
    determine, based on the execution of the plurality of execution paths, that a first execution path in the plurality of execution paths results in benign behavior and that a second execution path in the plurality of execution paths results in malicious behavior; and
    classify the computer program as evasive malware responsive to the determining.

13. The system of claim 12, where in the one or more computing processor are further configured to provide a controlled computing environment and the monitored computer program executes in the controlled computing environment.

14. The system of claim 13, wherein the controlled computing environment is a virtual machine.

15. The system of claim 13, wherein the controlled computing environment is based on hardware-supported virtualization.

16. The system of claim 12, wherein the one or more processor are configured to monitor execution of a computer program by monitoring one or more computer memory elements.

17. The system of claim 12, wherein access by the computer program of an item of environmental information comprises at least one of:
    a) the computer program reads one or more files;
    b) the computer program reads one or more registry keys;
    c) the computer program reads a variable maintained by the operating system;
    d) the computer program queries an event handler;
    e) the computer program queries an event queue;
    f) the computer program interacts with a device driver;
    g) the computer program interacts directly with hardware;
    h) the computer program interacts with a network; and
    i) the computer program interacts with the BIOS or firmware.

18. The system of claim 12, wherein a branch in the computer program is based on a value of the accessed item of environmental information when the computer program compares the value of the accessed item with a second information item.

19. The system of claim 18, wherein the second information item is a second item of environmental information.

20. The system of claim 12, wherein the one or more processors are further configured to alter the accessed item of environmental information to cause execution of the second path in the plurality of execution paths in the computer program.

* * * * *